United States Patent Office 3,772,351
Patented Nov. 13, 1973

3,772,351
UREA-FUNCTIONAL ORGANOSILICON
COMPOUNDS
Robert H. Krahnke, Midland, Mich., assignor to
The Dow Corning Corporation, Midland, Mich.
No Drawing. Original application Oct. 12, 1970, Ser. No. 80,191, now Patent No. 3,702,860. Divided and this application May 17, 1972, Ser. No. 254,020
Int. Cl. C07f 7/10, 7/18
U.S. Cl. 260—448.2 N                8 Claims

ABSTRACT OF THE DISCLOSURE

Silanes and siloxanes having urea functionality in the form of a

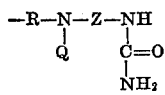

in which R is a divalent hydrocarbon radical free of aliphatic unsaturation of from 3–18 inclusive carbon atoms, Z is an ethylene, propylene, or substituted ethylene or propylene radical and Q is a hydrogen atom or a urea radical, are useful as sizing agents for glass fibers and as additives in the preparation of crease resistant resins.

This application is a division of copending application Ser. No. 80,191, filed Oct. 12, 1970, now U.S. Pat. No. 3,702,860.

This invention relates to novel urea-functional organosilicon compounds.

Cyclic urea derivatives of organosilicon compounds are known—see U.S. Pat. 3,209,053. The cyclic urea derivatives are prepared by reacting amino-functional silanes, such as $(CH_3O)_3Si(CH_2)_3NH(CH_2)_2NH_2$, with urea. Such derivatives have particular utility as additives in the preparation of durable water repellent finishes for cellulosic fabrics.

By the practice of the present invention, wherein the conditions are controlled during the reaction of urea with certain amino-functional silanes, one obtains novel acrylic urea derivatives of organosilicon compounds, as opposed to the known cyclic derivatives.

Thus, it is an object of the invention to prepare novel urea-functional silanes and siloxanes.

In accordance with the invention, there are provided organosilicon compounds of the formula

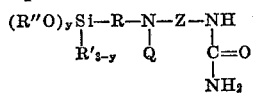

in which R is a divalent hydrocarbon radical free of aliphatic unsaturation of from 3 to 18 inclusive carbon atoms, R being attached to the nitrogen atom through a nonaromatic carbon atom, R' is a monovalent hydrocarbon atom of less than 7 carbon atoms, R" is selected from the group consisting of alkyl and acyl radicals of from 1 to 4 inclusive carbon atoms and radicals of the formula $-(CH_2CH_2O)_nR'''$ in which $n$ is an integer of 1 to 2 inclusive, R''' is an alkyl radical of from 1 to 4 inclusive carbon atoms, $y$ has a value of from 0 to 3 inclusive, Z is a divalent hydrocarbon radical selected from the group consisting of —CDHCDH— and —CDHCDHCH— in which D is a hydrogen atom or an alkyl radical of less than 7 carbon atoms, and Q is a hydrogen atom or a

The above silanes can be prepared by reacting silanes of the formula

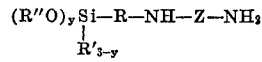

with urea at from 115 to 150° C. The nature of the product, either having monourea functionality (wherein Q is a hydrogen atom) or having diurea functionality (wherein Q is a urea radical) is controlled by the molar proportion of the reactants; the monourea product having obtained by reacting equimolar quantities and the diurea product being obtained by reacting two moles of urea with one mole of the silane. Ammonia is a by-product of the reaction.

The reaction occurs upon heating a mixture of the reactants to at least 115° C. Heating the reaction mixture to temperatures substantially above 150° C., for example 165° C., is to be avoided since at the higher temperatures the linear product will evolve additional ammonia to form the known cyclic derivatives. Preferred reaction temperatures are in the range of from 120 to 140° C. If desired, the reaction can be carried out in solvents. Suitable solvents include alcohols, such as methanol, ethanol and isopropanol; and hydrocarbons, such as toluene, xylene and the like.

The silane precursors,

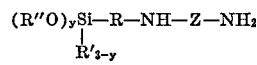

are well-known compounds and can be readily prepared by reacting a silane of the formula

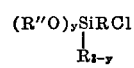

with a molar excess of a diamine of the formula $NH_2ZNH_2$.

Further in accordance with the invention, there are provided siloxane polymers containing at least one unit of the formula

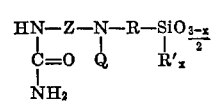

in which R is a divalent hydrocarbon radical free of aliphatic unsaturation of from 3 to 18 inclusive carbon atoms and which is attached to the nitrogen atom through a nonaromatic carbon atom, R' is a monovalent hydrocarbon radical of less than 7 carbon atoms, $x$ has a value of 0 to 2 inclusive, Z is a divalent hydrocarbon radical selected from the group consisting of —CDHCDH— and —CDHCDHCH— in which D is a hydrogen atom or an alkyl radical of less than 7 carbon atoms and Q is a hydrogen atom or a

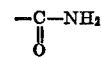

radical; any remaining siloxane units of the polymer being of the formula

in which Z' is selected from the group consisting of the hydrogen atom, a hydrolyzable group, the hydroxyl group, monovalent hydrocarbon radicals and monovalent halohydrocarbon radicals, and $a$ has a value of from 0 to 3 inclusive.

The siloxanes of the invention can be prepared by hydrolysis of the above described silanes. This hydrolysis can be carried out in the conventional manner employing one of the above described silanes, or any combination thereof to produce either homopolymers or copolymers. In addition copolymeric silanes in which only certain of the silicon atoms contain the described urea functionality can be prepared by cohydrolyzing the described silanes with hydrolyzable silanes of the formula $Z'_aSiX_{4-a}$ in which $Z'$ and $a$ are as defined above and X is a hydrolyzable group.

Another method for preparing the siloxanes of the invention is to react homopolymeric or copolymeric siloxanes containing the $\equiv SiRNHZNH_2$ substituents with urea in order to form the acylic urea derivatives. The conditions for this reaction are the same as those described for the preparation of the urea functional silanes.

In the silanes and siloxanes of this invention, R can be any divalent hydrocarbon radical free of aliphatic unsaturation and have from 3 to 18 inclusive carbon atoms and in which the R radical and the nitrogen atom are linked together by a nonaromatic carbon atom of the divalent hydrocarbon radical. That is, the carbon atom is not to be a part of an aromatic ring.

Specific examples of R are

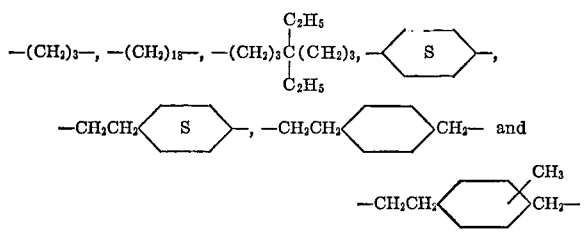

In both the silanes and siloxanes of the invention R' can be any monovalent hydrocarbon radical of less than 7 carbon atoms, such as alkyl radicals, for example, methyl, ethyl, propyl, butyl, and hexyl; alkenyl radicals, such as vinyl, allyl, or hexenyl; cycloaliphatic radicals such as cyclopentenyl or cyclohexenyl; and phenyl radicals.

R'' can be any alkyl radical, such as methyl, ethyl, isopropyl or butyl; an acyclo radical, such as formyl, acetyl, proponenyl; an alkoxy ethyl radical, such as β-methoxyethyl, β-ethoxyethyl, or β-butoxyethyl; and radicals of the formula $-(CH_2CH_2O)_2CH_3$, $-(CH_2CH_2O)_2C_2H_5$ and $-CH_2CH_2OC_4H_9$.

Z can be either an ethylene or propylene radical, or a substituted ethylene or substituted propylene radical. Thus, the divalent radicals include

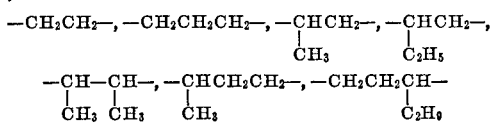

and

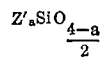

As discussed above, the siloxanes of the invention can be homopolymers, i.e.; those containing only silicon atoms having the defined urea functionality, or they can be copolymers containing siloxane units of the formula

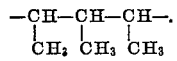

in which $Z'$ can be a hydrogen atom, a hydrolyzable group, a hydroxyl group, a monovalent hydrocarbon radical, or a monovalent halohydrocarbon radical and $a$ has a value of from 0 to 3 inclusive. Thus, the siloxane units can be of the formula $SiO_2$, $Z'SiO_{3/2}$, $Z'_2SiO$ and $Z'_3SiO_{1/2}$.

Illustrative of such monovalent hydrocarbon radicals are alkyl radicals such as methyl, ethyl, propyl, isopropyl, butyl, pentyl, isopentyl, neopentyl, hexyl, octyl, dodecyl, octadecyl, 3-methylheptyl, 6-butyloctadecyl, tertiary butyl, myricyl and 2,2-diethylpentyl; alkenyl radicals such as vinyl, allyl, hexenyl, butenyl, 3-octenyl, 4,9-octadecadienyl and 4-nonenyl; alkynyl radicals such as propynyl, heptynyl, butynyl, decynyl; alkenynyl radicals such as 1-penten-3-ynyl, 2-ethyl-1-buten-3-ynyl; cycloaliphatic radicals such as, cyclobutyl, cyclopentyl, cyclohexyl, cycloheptyl, propylcyclohexyl, 2,4-dimethylcyclopentyl, cyclohexenyl, bicyclo {3.1.0} hexyl, tricyclo {3.2.1.1^{3,8}}-5-nonenyl, spiro-{4.5} decyl, dispiro-{4.1.4.2}-1-tridecenyl, decahydronaphthyl, 2,3-dihydroindyl and 1,2,3,4-tetrahydronaphthyl; aryl radicals such as phenyl, tolyl, xylyl, 3-ethylphenyl, xenyl, naphthyl, anthracyl, pentacenyl, 3,4-methylethylphenyl, 9,9'-bifluoryl and 4-m-terphenyl; and aralkyl radicals such as 2-phenyl-octyl, 3-methyl-2-(r-isopropylphenyl)heptyl, benzyl, 2-ethyltolyl, 2-ethyl-p-cumyl, diphenylmethyl, 4,5-diphenylpentyl, 2-phenylethyl and 2-phenylpropyl.

Also within the scope of $Z'$ are monovalent halogenated hydrocarbon groups such as aliphatic groups such as chloromethyl, 3-chloropropyl, 3,3,3-trichloropropyl, perfluorovinyl, chlorooctadecyl or radicals of the formula $R_fCH_2CH_2-$ where $R_f$ can be any perfluoroalkyl group such as trifluoromethyl, perfluoroethyl, perfluoroisobutyl, perfluoroheptyl or perfluorooctadecyl; aromatic groups such as dichlorophenyl, tetrabromoxenyl, tetrachlorophenyl, α,α,α-trifluorotolyl or iodonaphthyl; cycloaliphatic groups such as chlorocyclohexyl, bromocyclopentyl or chlorocyclohexenyl and aralkyl groups such as chlorobenzyl, β-(chlorophenyl)ethyl or β-(isodiphenyl)ethyl or β-(bromophenyl)propyl. Because they are readily available, monovalent hydrocarbon and halohydrocarbon radicals having from 1 to 18 carbon atoms are preferred.

$Z'$ can be any hydrolyzable group such as halogen atoms such as F, Cl, Br or I; groups of the formula $-OZ$ when Z is any hydrocarbon or halogenated hydrocarbon group such as methyl, ethyl, isopropyl, octadecyl, allyl, hexenyl, cyclohexyl, phenyl benzyl, β - phenylethyl, 2 - chloroethyl, chlorophenyl, 3,3,3-trifluoropropyl or bromocyclohexenyl; any hydrocarbon ether radical such as 2-methoxyethyl, 2-ethoxyisopropyl, 2-butoxyisobutyl, p-methoxyphenyl or $$-(CH_2CH_2O)_2CH_3$$

any acyl radical such as acetyl, propionyl, benzoyl, cyclohexoyl, acrylyl, methacrylyl, stearyl, naphthoyl, trifluoroacetyl, chlorobenzoyl or bromopropionyl; or any N,N-amino radical such as dimethylamino, diethylamino, ethylmethylamino, diphenylamino, or dicyclohexylamino. X can also be any amino radical such as $NH_2$, dimethylamino, diethylamino, methylphenylamino or dicyclohexylamino; any betoxime radical of the formula $$-ON=CM_2$$

or $-ON=CM'$ in which M is any monovalent hydrocarbon or halogenated hydrocarbon radical such as those shown for Z above and M' in any divalent hydrocarbon radical both valences of which are attached to the carbon, such as hexylene, pentylene or octylene; ureido groups of the formula $-N(M)CONM''_2$ in which M is defined above and M'' is H or any of the M radicals; carbamate groups of the formula $-OOCNMM''$ in which M and M'' are defined above, or carboxylic amide radicals of the formula $-NMC=O(M'')$ in which M and M'' are defined above. X can also be the sulfate group or sulfate ester groups of the formula $-OSO_2(OM)$ where M is defined above; the cyano group; the isocyanate group; and the phosphate group or phosphate ester groups of the formula $-OPO(OM)_2$ in which M is defined above.

The term "hydrolyzable group" means any group attached to the silicon which reacts with water at room temperature to form silanol radicals.

The silanes and siloxanes of the invention are useful as sizing agents for siliceous materials for the purpose of increasing bond strength between the siliceous materials and aminoplast-formaldehyde resins such as melamine-formaldehyde, urea formaldehyde, triazine formaldehyde and other urea aldehyde resins. The compositions are also useful in forming copolymers with aldehyde aminoplast, particularly formaldehyde-aminoplast resins. These copolymers can be prepared by heating the methylol derivatives of urea, melamine or other amino resins with the acyclic urea organosilicon compounds of this invention.

The solubility of the methoxysilanes of this invention make them useful in a wide range of solvent systems. For example, when these materials are solubilized in acidified water they are particularly useful in sizing siliceous surfaces, such as glass fibers or sand particules. When the sized siliceous surface is utilized as a reinforcing agent in silicon resins or formaldehyde-aminoplast resins the resulting composite material has a very high strength.

The compositions of the invention can also be used in the treatment of cellulosic fabrics in order to impart more durable water repellency to the fabric. This is accomplished by applying the compounds to the fabric and thereafter heating the fabric to effect the cure of the organosilicon compound. The increased durability of the water repellent coating is best realized when the treatment is employed in conjunction with the conventional crease resistance resins for cellulosic fabrics. The organosilicon compounds of the invention can be applied to the fabric either combined with, prior to, or subsequent to, the crease resistant resin. Dimethylsiloxane copolymers containing at least 5 percent by weight of siloxanes of the resin are preferred for use in conjunction with the crease resistant resins. Examples of the types of crease resistant resins which are operative in this invention are urea-formaldehyde resins, alkylene urea-formaldehyde resins, triazine formaldehyde resins or epoxide resins.

The following examples are illustrative only and should not be construed as limiting the invention which is properly delineated in the appended claims.

EXAMPLE 1

A mixture of 300 grams of urea (5 moles) and 1255 grams (10 equivalents) of $$(CH_3O)_3Si(CH_2)_3NH(CH_2)_3NH_2$$

was heated under a nitrogen atmosphere at 120° C. for 4 hours. The product,

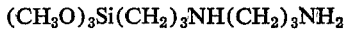

had a neutral equivalent of 280 (calculated 264). This product was a clear yellow fluid having a refractive index of 1.4710 and a viscosity of 905 cs. when measured at 25° C. The above structure was confirmed by N.M.R. analysis.

This silane was added to Ottawa sand in an amount equal to 0.5 weight percent of the sand and the treated sand was then mixed with 2% of a commercially available furan resin. The resin-sand formulaton was cured to form foundry sand cores which retain their strength under conditions of high temperature and high humidity.

EXAMPLE 2

A mixture of 1255 grams of $$(CH_3O)_3Si(CH_2)_3NH(CH_2)_2NH_2$$

and 600 grams of urea was heated at 120° C. for 4½ hours and then at 130° C. for one hour. The product,

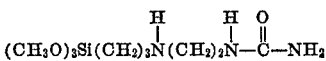

was an amber, taffy-like solid, was softened to a thin fluid when warmed. The above structure was confirmed by N.M.R. analysis.

EXAMPLE 3

A mixture of 3 grams (0.5 mol) of urea and 26.5 grams (0.1 equivalent) of a copolymer of the formula

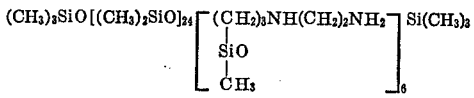

was heated at 130° C. for 3 hours while bubbling nitrogen to the mixture. The exit vapors were passed through water and titrated with sulfuric acid. The titration showed that 45.8 mol equivalents of ammonia were evolved (theoretical value equals 50 mol equivalents). The product,

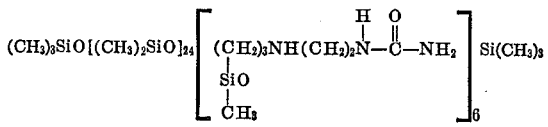

had a neutral equivalent of 574 (calculated value of 580).

This copolymer can be used in conjunction with a crease resistant resin as previously described in the specification.

EXAMPLE 4

A mixture of 3 grams of urea (0.05 mole) and 5.9 grams (0.025 mole) of $$(CH_3O)_3Si(CH_2)_3NH(CH_2)_3NH_2$$

was agitated under nitrogen purge and heated for 30 minutes at 110° C. There was no ammonia evolution. The temperature was then raised in 5° increments, with each new temperature level being maintained for 30 minutes. Ammonia evolution was detected at 115° C. by means of $H_2SO_4$ titration. At 120° C. the evolution became quite rapid. A total of 40 mol equivalents of ammonia were evolved after 194 minutes at 120° C. The product,

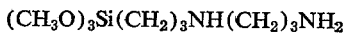

was a colorless, resin-like solid.

Reasonable modification and variation are within the scope of the invention which sets forth novel urea functional silanes and siloxanes.

That which is claimed is:

1. Organosilicon compounds of the formula

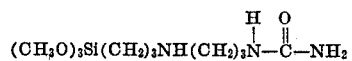

in which

R is a divalent hydrocarbon radical free of aliphatic unsaturation of from 3 to 18 inclusive carbon atoms, R being attached to the nitrogen atom through a nonaromatic carbon atom, R' is a monovalent hydrocarbon radical of less than 7 carbon atoms, R" is selected from the group consisting of acyl and alkyl radicals of from 1 to 4 inclusive carbon atoms and radicals of the formula —$(CH_2CH_2O)_nR'''$— in which $n$ is an integer of 1 to 2 inclusive and R''' is an alkyl radical of from 1 to 4 inclusive carbon atoms, $y$ has a value of from 1 to 3 inclusive, and Z is a divalent hydrocarbon radical selected from the group consisting of —CDHCDH— and

—CDHCDHCDH— in which D is a hydrogen atom or an alkyl radical of less than 7 carbon atoms.

2. An organosilicon compound in accordance with claim 1 of the formula

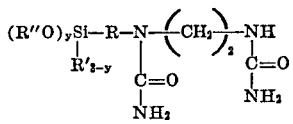

3. An organosilicon compound in accordance with claim 2 wherein R'' is an alkyl radical containing from 1 to 4 inclusive carbon atoms.

4. An organosilicon compound in accordance with claim 3 of the formula

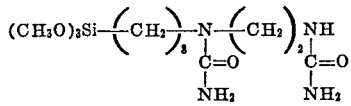

5. A siloxane polymer in which at least one siloxane unit is of the formula

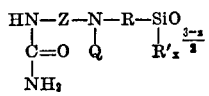

in which
R is a divalent hydrocarbon radical free of aliphatic unsaturation of from 3 to 18 inclusive carbon atoms which is attached to the nitrogen atom through a nonaromatic carbon atom,
R' is a monovalent hydrocarbon radical of less than 7 carbon atoms,
$x$ has a value of from 0 to 2 inclusive,
Z is a divalent hydrocarbon radical selected from the group consisting of —CDHCDH— and

—CDHCDHCDH— in which D is a hydrogen atom or an alkyl radical of less than 7 carbon atoms,
Q is a hydrogen radical or a

radical, any remaining siloxane units in said polymer being of the formula

in which
Z' is selected from the group consisting of the hydrogen atom, a hydrolyzable group, the hydroxyl group, monovalent hydrocarbon radical and monovalent halohydrocarbon radicals, and
$a$ has a value of from 0 to 3 inclusive.

6. The siloxane polymer of claim 5 in which Q is a

radical.

7. The siloxane polymer of claim 5 in which Q is a hydrogen atom.

8. A trimethylsiloxy endblocked siloxane polymer in accordance with claim 7 consisting essentially of

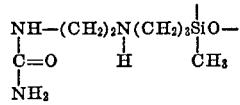

units and

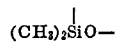

units.

References Cited
UNITED STATES PATENTS

| | | | |
|---|---|---|---|
| 3,361,783 | 1/1968 | Fink | 260—448.2 N |
| 3,506,701 | 4/1970 | Di Paola | 260—448.2 N |
| 3,576,033 | 4/1971 | Tesoro et al. | 260—448.8 R |
| 3,657,303 | 4/1972 | Golitz et al. | 260—448.2 N |
| 3,676,478 | 7/1972 | Golitz et al. | 260—448.2 N |

DANIEL E. WYMAN, Primary Examiner

P. F. SHAVER, Assistant Examiner

U.S. Cl. X.R.

260—46.5 E, 448.2 E, 448.8 R

U.S. PATENT OFFICE

UNITED STATES PATENT OFFICE

CERTIFICATE OF CORRECTION

Patent No. 3,772,351                                Dated: November 13, 1973

Robert H. Krahnke

It is certified that errors appear in the above-identified patent and that said Letters Patent are hereby corrected as shown below:

Column 7, line 20, in the formula, it appears to read "$\frac{3-z}{2}$" and should read --$\frac{3-x}{2}$--.

Column 8, line 3, in the formula "$\frac{1-a}{2}$" should read --$\frac{4-a}{2}$--.

Signed and sealed this 16th day of April 1974.

(SEAL)
Attest:

EDWARD M. FLETCHER, JR.                C. MARSHALL DANN
Attesting Officer                      Commissioner of Patents